July 27, 1965  T. M. ELFVING ETAL  3,196,620

THERMOELECTRIC COOLING SYSTEM

Filed Feb. 10, 1964  7 Sheets—Sheet 1

INVENTORS
THORE M. ELFVING
SVEN T. ELFVING
BY

July 27, 1965    T. M. ELFVING ETAL    3,196,620
THERMOELECTRIC COOLING SYSTEM
Filed Feb. 10, 1964    7 Sheets-Sheet 2

INVENTORS
THORE M. ELFVING
SVEN T. ELFVING
BY

INVENTORS
THORE M. ELFVING
SVEN T. ELFVING
BY

INVENTORS
THORE M. ELFVING
SVEN T. ELFVING
BY

INVENTORS
THORE M. ELFVING
SVEN T. ELFVING

United States Patent Office 3,196,620
Patented July 27, 1965

3,196,620
THERMOELECTRIC COOLING SYSTEM
Thore M. Elfving, 433 Fairfax Ave., San Mateo, Calif., and Sven Thomas Elfving, San Mateo, Calif.; said Sven T. Elfving assignor to said Thore M. Elfving
Filed Feb. 10, 1964, Ser. No. 343,678
27 Claims. (Cl. 62—3)

The present invention relates generally to thermoelectric heat pumps and particularly to thermoelectric thermocouple assemblies such as may be incorporated in air conditioning systems of both the water to water and the water to air type. The invention can also be used for thermoelectric cooling systems in general for cooling of liquids or gases (air) in industrial plants, cold storage plants, refrigerators and ice freezers.

Hitherto used thermoelectric heat pumps for the above uses generally comprise a plurality of thermocouples connected in series with hot and cold junction bridges in the form of flat copper straps disposed substantially on respective planes parallel to each other. The thermoelectric assembly, module or package thus has the form of a cake or plate wtih the hot and cold junctions on opposite sides, facing each other over the entire surface of the assembly at a distance equal to the length of the semiconductive pellets or blocks utilized in the unit. Assemblies of this type usually have to be electrically insulated before brought in contact wih metal cover plates or heat exchangers of various types. Insulating methods involve lacquers and films, anodizing etc. Ceramic materials in the form of wafers or sprayed layers have also been employed. Ceramic materials of high thermal conductivity have the advantage that they can be metalized and soldered to metal surfaces with a minimum of interface temperature drop.

Water cooled thermocouple assemblies of the above type can be stacked on top of each other in different ways to form assemblies with a high cooling capacity per unit of volume. Such assemblies can be built for both water to water and water to air systems. In such assemblies, the temperature on the cold junction sides is normally substantially the same all over the modules.

There are several inherent weaknesses in assemblies and batteries of the described type: Modern thermocouples are built with short leg length, the most common length being ⅛ or 3 mm. This means that no more than ⅛ inch of insulation can be used between the surface and the heat losses across the assembly will be controlled by this thickness of insulation. High capacity modules are built with relatively low packing density (large junction straps in relation to the cross-section of the semiconducting material) which results in increased losses.

It is an object of this invention to provide thermocouple assemblies in which the heat losses between the hot and cold junction sides are minimized permitting the use of short-legged thermocouples.

In thermocouple assemblies of the conventional type, the surface areas of the hot and cold junction bridges are equal in size. The basic heat transfer area is the same on both sides in spite of the fact that, generally, much more heat has to be dissipated on the hot junction side than is absorbed on the cold side. The heat load per unit of heat transfer area at the junctions can be many times larger on the hot junction side than on the cold junction side. With a coefficient of performance of 1, the relation is 2:1; at a COP of 0.5, the relation is 3:1. The difference in heat transmission coefficient causes problems when heat transfer takes place to liquid (water), to gas (air) or to boiling or condensing fluids.

It is another object of this invention to provide thermocouple assemblies or batteries where the surface area of the hot and cold junctions are independent of each other so that assemblies can be designed for maximum efficiency as to heat transfer at the hot and cold junctions. As an example, the hot junction basic surface area can be made 2 or 3 times as large as the cold junctions, or vice versa, according to the specific design purposes.

Another serious drawback of hitherto used thermoelectric assemblies, package units or stacks is that thermal expansion and contraction which takes place when the hot junctions are getting hot and the cold junctions cold is hard to compensate. This phenomenon is apt to cause broken junction points or micro cracks in the semiconducting material itself and can seriously threaten the efficiency and life of the assembly. This problem is aggravated in air conditioning systems where the current is reverse to heat and cool. The firm bond between the junctions and their cover plates or heat exchangers causes severe stress problems which necessitates the use of an otherwise undesirable soldering technique at the junction between the semiconducting material and the copper straps.

It is another object of this invention to provide thermoelectric assemblies and batteries or stacks where the stress problem, because of thermal expansion and contraction, is minimized.

As conventional thermocouple assemblies, package units and batteries now are designed and the way they are soldered to cover plates and heat exchangers on the cold and hot junction sides, there is practically no way of repairing faulty thermocouples with bad junctions or cracked material inside the assembly. It is even almost impossible to locate the defective couple and one broken junction or a similar fault may cause the whole unit to be scrapped.

It is another object of this invention to provide thermoelectric assemblies and heat exchange units in which the individual thermocouples are accessible for repair or for short circuiting so that the unit can be easily repaired.

Theoretically, continuous cooling of liquids in pipes can be carried out stepwise in several sections each cooled by a separate thermoelectric heat pump and with a successively increased current input corresponding to the mounting temperature difference ($\Delta t$) between the hot and cold junction side of the heat pumps in each section. In this way, a considerably higher overall COP can be obtained compared with the result when the $\Delta t$ is approximately the same all over the thermoelectric device. Conventional thermocouple arrays, stacks of such arrays and heat exchanger units made from such arrays are provided with heat equalizing members such as copper cover plates and are energized with the same current to all the thermocouples. The theoretical possibility of obtaining a maximal overall COP is not utilized. A thermoelectric heat exchange unit, according to the invention, can be built in such a way that the thermocouples along the path of the fluid to be cooled can operate with gradually increasing $\Delta t$. This favorable condition is further improved by feeding the individual thermocouples or groups of thermocouples with an increasing current along the path of the liquid to be cooled.

It is further a general object of this invention to provide an improved thermoelectric thermocouple design characterized by junction bridges in the form of short metal tubes with or without an electric insulation on the inside wall joined longitudinally into continuous pipes to allow a liquid to circulate through the cold and/or hot junction bridges.

In thermocouples, according to the invention, the current density distribution in the semiconducting material as well as in the junction straps is improved. The semiconducting material is better utilized, and lighter and less expensive strap material can be used, for instance, aluminum instead of copper. The invention also describes a manufacturing method by which improved thermocouples can be assembled in arrays or stacks under complete control of soldering temperatures, etc.

Other objects and features of my invention will appear from the following description of the invention with reference to the accompanying drawings in which

FIGURE 3 is an exploded view of still another liquid to liquid thermoelectric module design;

FIGURE 6 is a view, partly in section, of a thermoelectric air conditioner based on the assembly shown in FIGURE 5;

Figure 1:
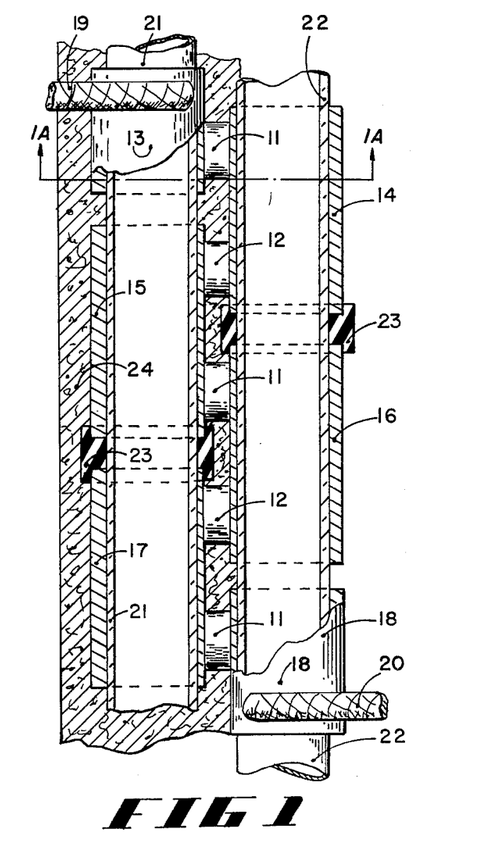
FIGURE 1 shows an elevational view, partly in section, of a thermoelectric module design in a liquid to liquid system according to the invention.
Figure 1A:
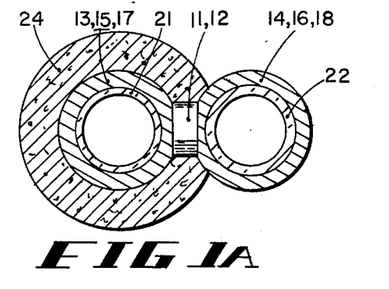
FIGURE 1A is a sectional view taken along the line 1A—1A of FIGURE 1.

FIGURE 1 shows a somewhat enlarged view of a thermocouple assembly where 11 and 12 are semiconducting blocks or pellets of P and N type respectively. The semiconducting blocks are soldered to spaced, staggered short copper tubes 13, 14, 15, 16, 17 and 18. Direct current is supplied from a power supply through the lead 19. The current flows serially through the tubes and the interspaced semiconducting blocks to the other lead 20 of the power supply. Depending upon the current direction, the tubes 13, 15 and 17 will form cold junction bridges, and the tubes 14, 16 and 18, hot junction bridges in the series of thermocouples comprising the semiconducting blocks shown in the figure. The tubes 13, 15 and 17 on one side and 14, 16 and 17 on the other are arranged in two straight lines as shown in the figure and united into solid pipelines by pipes 21 and 22. The pipes 21 and 22 are preferably made from an electric insulating material with high heat conductivity such as aluminoxide or berylliumoxide. The pipes 21 and 22, which can be in one piece or in sections, are in a known manner metallized on the outside in sections corresponding to the tube junctions and soldered to the inside of the copper tubes for minimum thermal resistance. The described thermocouple array including junction tubes 13, 15 and 17 can, after energizing, serve as a cooling device for a liquid passing through tube 21 while cooling water circulating through pipe 22 serves as heat sink for the hot junctions formed by tubes 14, 16 and 18. The heat transfer will in this way take place with a minimum of interface temperature drops. In order to strengthen the thin ceramic portions between the copper tubes, the pipe sections are joined by non-metallic rings or bandage 23. As shown in FIGURE 1A, the junction tubes can be flattened on the side facing each other to allow semiconducting blocks to be soldered to a flat surface. The pipe 21 connecting the cold junctions may be embedded in an insulation 24. The heat transfer distance between the hot and cold junction bridges has a minimum corresponding to the length of the semiconducting blocks. This minimum exists only across the semiconducting material itself and along the corresponding flat area of the copper tubes. The heat transfer between the hot and cold junction sides is, therefore, minimized. The ceramic inserts and the outside copper tubes on the hot and cold junction sides, respectively, can be of different size or diameter according to the purpose of the heat pump.

Figure 2:
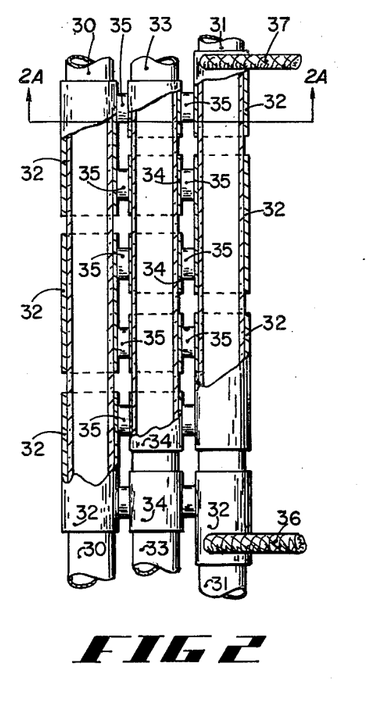
FIGURE 2 shows an elevational view, partly in section, of another liquid to liquid system according to the invention.
Figure 2A:
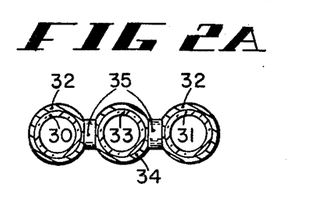
FIGURE 2A is a sectional view taken along the line 2A—2A of FIGURE 2.

In FIGURE 2 is shown another type of thermocouple design according to the invention. The hot junctions are here located on both sides of the cold junctions (or vice versa) forming an array of thermocouples utilizing three liquid passages. On the sides are two partly metallized ceramic pipes or pipe sections 30 and 31 provided with copper tubes 32 in soldered contact with the metallized ceramics and staggered as illustrated by the drawing. Between the pipes 30 and 31 are another assembly pipe 33, also metallized in sections, and connecting copper tubes 34 soldered thereto. The cylindrical copper tubes are on the side facing each other; flattened and semiconducting thermoelectric blocks 35 soldered therebetween to form a series of thermocouples with all the cold junctions in the middle and the hot junctions on the sides are illustrated. This thermoelectric heat pump array is supplied with direct current through the leads 36 and 37. The flow of current through the cold junction tubes is different from that previously described. The current flows across these copper pipe sections instead of lengthwise. The current is consequently divided into two paths from one tube 32 to the other. The heat flow to or from the soldered thermoelectric junction ends on both sides of the tube in relation to a liquid passing the pipe 33 is thereby taking place with maximum of heat transfer area and a minimum of interface temperature drops. The assembly pipes can have different diameters independently of each other and the joints between the copper tube sections can be reinforced by rings of nonconductive material connecting the copper pipe section to form a stiff structure. The described thermocouple array, which as to size and numbers of couples only serve to illustrate the principle, can be used for cooling a liquid (water or brine) in the middle pipe while cooling water is circulated in the outside pipes to remove heat from the hot junctions of the thermoelectric heat pump, or vice versa. Several units of this type can be combined electrically and as to liquid flow and the resulting battery embedded in a suitable insulating material such as foam or powder insulation. As to insulation efficiency and heat transfer to the circulating liquids, the same reasoning applies as under FIGURE 1.

The accessibility to the individual thermocouples in an array or battery of arrays of this type is evident without explanation. If a thermocouple breakdown occurs, the unit can be restored by simply short circuiting the faulty couple by connecting the hot junction sections on both sides across the middle pipe section so that the broken joint or material is bypassed.

In FIGURE 3 is shown still another type of thermocouple according to the invention. The view is magnified and exploded in order to better illustrate the details. Copper or aluminum metal tubes 40 with their axes in a straight line are, as before provided with a ceramic liner in the form of a metallized ceramic pipe section 41 in soldered contact with the inside of the metal tubes. The ceramic liners 41 are, in this case, individual pieces soldered to each metal section with end pieces sticking out of the metal cylinders. The assembly of the pipes takes place by means of joint pieces 42 made from a nonconductive material and glued to the ceramic end pieces and the edges of the metal tubes with a water proof and gas-tight glue. The metal tubes are in this way electrically insulated and firmly bonded to each other to form a straight pipe in which a liquid can be passed in good thermal contact with the metal tubes. In FIGURE 3 is shown how two sections are joined together in this way with similar tube sections pairwise on each side with the tube axis perpendicular to that of the tube in the middle.

Semiconducting blocks 43 are soldered to the flattened portions 44 of the tube sections 40 as previously described to form two series of thermocouples along the center lines 45 and 46, respectively. It is easily perceived that this configuration extended in all directions will lead to a three-dimensional array of thermocouples through which liquids can be passed in two directions, one for the liquid to be cooled in several parallel pipes and one for the cooling water also in several parallel pipes as will later be more closely described. The junction tube sections are at right angles at the point where the semiconducting forms a bridge between them. Alternate sections will become hot junctions and cold junctions with a minimum of heat transfer between them through the insulation material in which the whole structure can be embedded. The ceramic sections inserted in the pipes is very thin, say from 10 to 30 thousandths of an inch and made from a ceramic material of high heat conductivity. The inside lining 42 serves to insulate the liquids from the electric voltage and can obviously be made from many other types of material like mylar and lacquer films of various kinds. When aluminum tube sections are used, hard coating or anodizing is sufficient. The joint pieces 42 between the junction tubes have to be designed accordingly so that a continuous and strong pipe structure is obtained. In certain cases, the insulation around the junction tubes and the semiconducting bodies can serve as a closing material joining the tubes into a continuous liquid conduit. Such insulation material of a waterproof nature can be foamed or poured around the tubes, while prevented by suitable means to enter into the tubes, thereby forming a continuous passage along the inside of the tubes. The pipe system can in other cases be made pressure and vacuum-tight, and the lining and joining material chosen so that one or both of the pipe systems can be filled with a heat transfer media such as Freon for heat transfer by a liquid/vapor hermetic system instead of circulating liquids.

Figure 4:
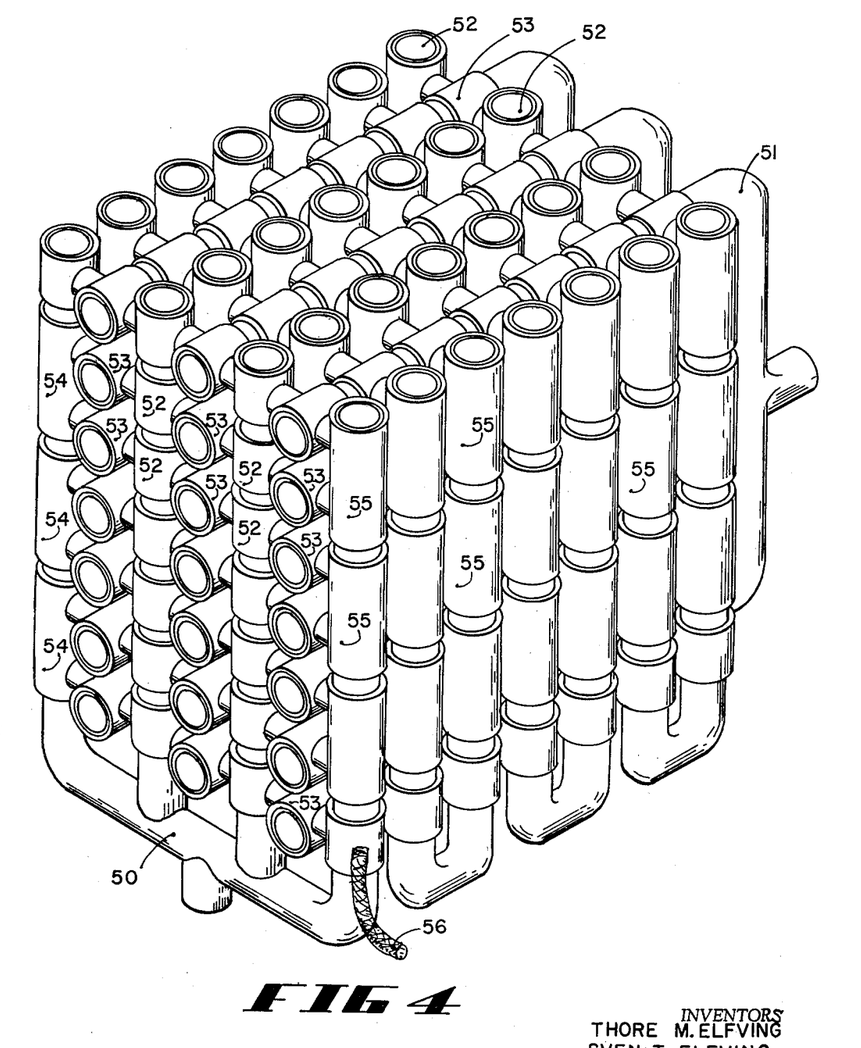
FIGURE 4 shows a thermoelectric heat exchange stack including elements of the type shown in FIGURE 3.

The described type of thermocouples, according to the invention, are suitable for standardizing and can be manufactured in semi-finished parts before the assembly into a larger heat pumping assembly. Such a basic unit can, for instance, comprise one copper tube section with an inserted and soldered thin ceramic pipe section together with semiconducting blocks soldered with Bismuth tin or similar alloy to the flat portions on each side of the tube. Many such thermocouple units together with reinforcing nonconductive sealing rings can be assembled longitudinally into a continuous pipe comprising the desired number of thermocouples. A number of such larger groups can then be placed parallel in a suitable jig or fixture at a suitable distance from each other and crossed by similar pipe groups without semiconducting material. The latter pipes are placed so that a flat side of each tube section without a semiconducting block can be soldered to a corresponding block of semiconducting material. By adding alternate layers of pipes in this way cross wise to each other, a three-dimensional assembly of thermocouples is created as is illustrated by FIGURE 4. The soldering of the pipe groups to each other is according to the invention carried out under complete temperature control by circulating a liquid of suitable temperature in the assembly pipes during the soldering process.

FIGURE 4 shows in an isometric view how a three-dimensional thermocouple assembly for a water to water heat exchanger system is constructed along the principles outlined under FIGURE 3. The design of the individual thermocouples is essentially the same as in FIGURE 3 although certain elements like the reinforcing nonconductive ring elements between the copper sections are left out and not shown in the drawing. A parallel flow of liquid in both phases is shown with headers 50 and 51 for the liquid to be cooled and the cooling water, respectively. The liquid flow can be arranged in many different ways. The cooled liquid can be made to circulate through the system with increasing $\Delta t$ as previously described. This can be further utilized for obtaining a higher overall coefficient of performance by connecting the thermocouples electrically in such a way that the current through the thermocouples increases along the path of the liquid flow. The electric coupling for such a graded energizing is quite simple to achieve because of the complete accessibility of the individual thermocouples which can be electrically arranged in parallel groups with a varying number of couples in series to each group. The gradually increased energizing to match the maximum COP for each $\Delta t$ represents the optimum of efficiency. It should be emphasized, however, that the mounting $\Delta t$ in itself improves the overall efficiency even when all the thermocouples are fed with the same current. A thermocouple array according to FIGURE 4 lends itself ideally to either of these alternatives.

In FIGURE 4 is shown how the vertical pipe sections 52 together with the horizontal pipe sections 53 form horizontal rows of thermocouples in series. The horizontal rows are electrically connected in series by the double end pieces 54 and 55, respectively. Instead of the double end pieces, two pieces of standard size connected by a copper wire would give the same result. The front rows form a rectangular array of thermocouples in a vertical plane energized by the lead 56 in such a way that the vertical tube sections 52 form cold junction bridges. The next vertical plane constitutes another array of thermocouples with the same number of rows and so on. The liquid to be cooled can enter through the header 50 and pass one such vertical array after another by connecting the vertical pipes at the top and the bottom in series as indicated at the bottom of the stack. The liquid will gradually lower its temperature with a corresponding increase of the $\Delta t$ between the hot and cold junctions. The number of thermocouples in a horizontal row as well as the number of rows in a vertical plane array can vary greatly according to the purpose. The flow of liquid and cooling water can in the same way vary in a great many combinations.

There is no insulation shown in FIGURE 4, but it is obvious that the stack should be embedded in an insulation material such as foam or powder insulation. The length of the semiconducting blocks determines the minimum insulation space but it should be noted that this minimum distance between hot and cold parts of the system only exists at the crossing points across the semiconducting material. Everywhere else the distance is larger and the heat losses, therefore, substantially reduced as compared to conventional systems.

Another outstanding feature of a thermocouple stack or heat exchanger unit described in FIGURE 4 is the almost total elimination of the stress problems due to thermal expansion and contraction. The contraction of the cold junctions results in a closing of the distance between the hot junctions and the corresponding cooling water pipes and vice versa. Thus, the creation of a thermoelectric stack according to the invention in the form of crossing grid systems united in individual points is a considerable improvement over conventional systems and results in better junctions of larger life length and a safer and more efficient operation of air conditioners and other types of thermoelectric heat exchangers.

In a unit of the described type, a faulty thermocouple can be easily located and short circuited after removing some of the insulation.

It is obvious that the dimensions and length of the respective junction tubes and other design elements can vary so that adequate heat transfer surfaces are obtained for any case. Because of the crosswise arrangement of hot and cold junctions, their dimensions have little bearing on the heat losses between them. The same is true of the length of the semiconductive material. It can be shortened to an absolute minimum without introducing excessive heat losses.

Figure 5A:
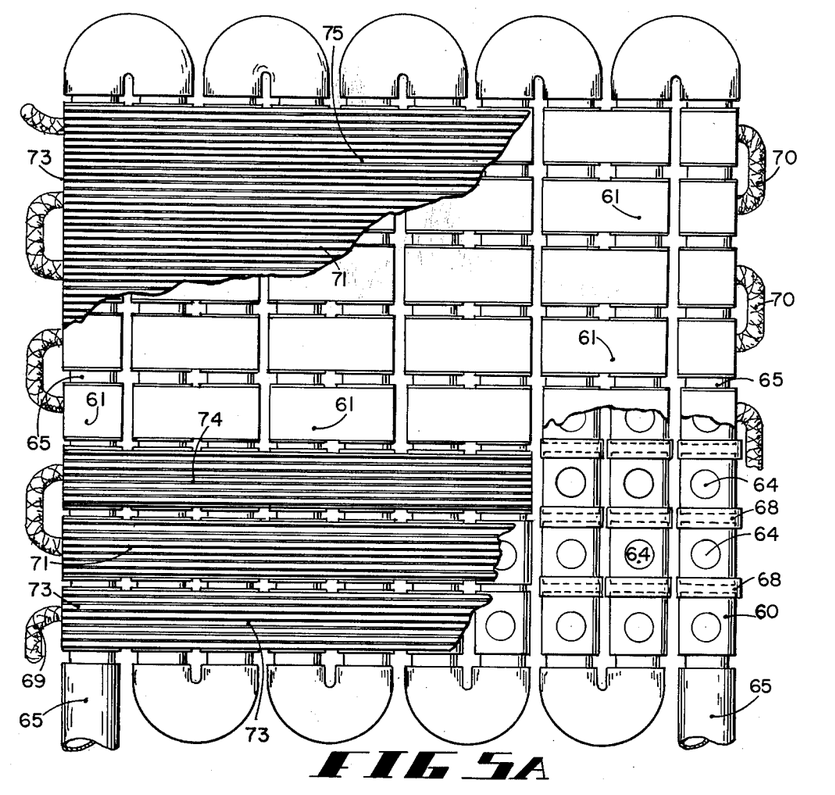
FIGURES 5A and 5B are views, partly in section, of a double-sided liquid to air thermoelectric heat pump assembly corresponding to the liquid to liquid module shown in FIGURE 2.
Figure 5B:
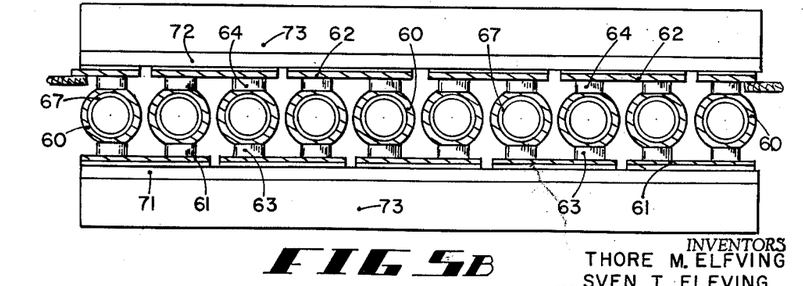

FIGURES 5A and 5B show how a heat exchange unit is built for a water to air system according to the invention. The individual thermocouples are built according to FIGURE 3 with the design modification that the junction bridges on both sides of the central tube section 60 are in the form of flat copper straps 61 and 62, respectively, instead of tube sections. The copper straps 61 and 62 are staggered and soldered to the semiconducting P and N type blocks 63 and 64, respectively, on both sides of the central tube sections to form a series of thermocouples with junction ends belonging to adjacent liquid circulating pipes 65.

The liquid circulating pipes 65 are assembled from longitudinally connected copper tube sections 66 with inside soldered ceramic linings 67 together with sealing ring elements 68 in the way described under FIGURE 3. Adjacent liquid circulating tubes 65 have their tube junction bridges pairwise united by copper straps 61, 62 forming cold junction straps on both sides of the central liquid circuiting pipes 65. Several circulating pipes 65 in parallel will in this way form a double-sided thermoelectric heat exchange panel as illustrated by the drawing with cold junction straps on both sides and with the cooling water system in the middle. The unit is energized through leads 69 and connected on each side by cables 70 to form a thermocouple array in series.

The heat exchange between the cold junctions 61, 62 and the air takes place over cover plates 71 and 72 soldered to the junction plates after spraying them with a ceramic material like $Al_2O_3$ and metallizing. The cover plates 71, 72 are provided with copper fins 73 spaced approximately 15 fins per inch and made from 0.01 in. copper with a fin height of 0.5–0.7 inch. The fins can be folded to form a sinusoidal air passage. Such a heat exchange system has a high heat transmission per unit of plate area. The finned plates can, according to the invention, be made in separate plates for individual junction straps or in strips 74 for each row of copper straps across the central pipes as illustrated by the figure. Such a system of a central hot junction pipe system with cold junction heat exchange surfaces on both sides is perfectly balanced as to thermal expansion and contraction. Contraction of the finned cover strips on both sides will only result in a slight closing of the distance between the central liquid pipes, and vice versa. According to the invention, it is also possible to use a continuous finned cover plate 75 as illustrated on a portion of the figure. A contraction in the direction perpendicular to the fins will be absorbed by the flexible ring elements between the central tube sections and the flexible cable connections 70 which will prevent the stress on the soldered junctions and the semiconducting material itself. For the same reason, finned cover strips can be placed along the pipe lines in a direction perpendicular to the strips shown in the figure. The fins will then be short in the direction of the air flow. Such an arrangement will lead to a successively increased $\Delta t$ along the air flow without significant heat equalizing in the finned cover strips.

When the current is reversed, the thermoelectric heat pumping unit shown in FIGURES 5A and 5B will act as an air cooled liquid cooler. The assembly can be standardized in single pipe units of different lengths, in multiple pipes, two-dimensional panels, or in three-dimensional stacks. The heat pump unit can be used as a thermoelectric air conditioner for both cooling and heating with the "cooling" water acting either as a heat sink or as a heat source according to the polarity of the current.

In FIGURE 6 is shown a thermoelectric air conditioning unit based on the panels described under FIGURES 5A and 5B. The air conditioner is a floor model. It includes a housing 80 with air intake through slots 81 at the bottom of the front and air delivery through opening 82 at the top of the unit. The air is circulated through the unit by fans 83 which pull the air through a battery of water-cooled thermoelectric heat pump panels 84 separated by sheet metal dividers 85. In the figure is shown the individual thermocouples with semiconducting material on both sides of the copper tube sections 86 in which the cooling water from the main water supply 87 is circulated to the return pipe 88. The assemblies 84 have heat exchange copper fins 89 on the flat copper strap junctions on both sides and a foam type insulation 90 in the middle between the cold junction straps. The water supply can come from the water main in the building or from a special circulating system in which water or a suitable cooling liquid is heated during the winter time and cooled during summer time to supply the air conditioner with a heat source or a cooling fluid according to the season. The thermoelectric units are supplied with direct current through the leads 91 and the units have a thermostatic control 92 to apply a D.C. voltage for either heating or cooling. A thermoelectric unit of the type described is to be considered as a complement to the ventilating air system which usually is set at a constant temperature of, say, 56° F. According to the occupation load, machinery, sun load, etc., additional cooling or heating has to be added to each room unit in a building. A thermoelectric air conditioner of this nature can be an independent self-contained unit with built-in fans as in FIGURE 6, or a unit attached to the main ventilation duct system.

Figure 7:
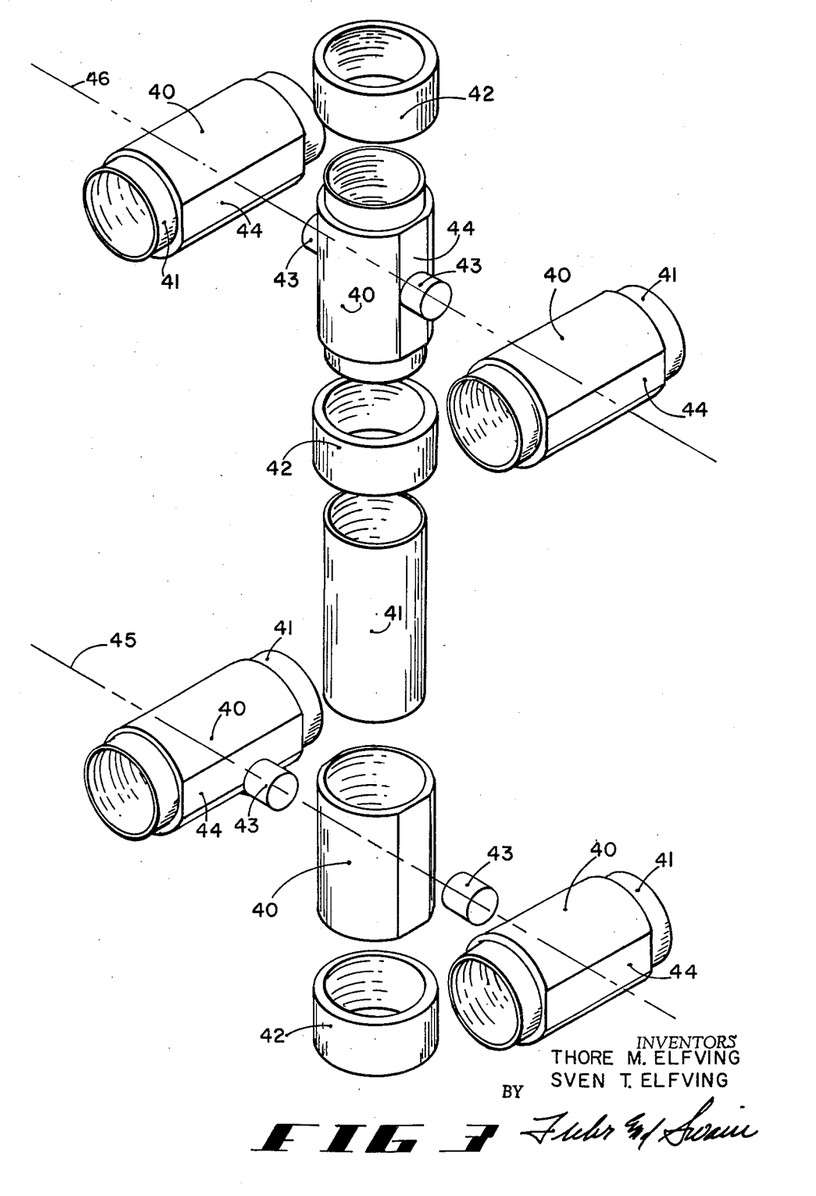
FIGURE 7 shows a thermoelectric air conditioner for duct mounting.

In FIGURE 7 is shown a thermoelectric air cooling heating unit according to the invention intended for connection to an air supply duct. The water-air thermoelectric heat exchange unit is enclosed in a housing 95 for duct connection through the flanges 96 and 97 which indicates the direction of the air flow. The thermoelectric heat pumping system comprises four double-sided panels 98 each consisting of 130 thermocouples arranged in ten rows perpendicular to the air flow. The individual thermocouples are indicated on the drawing showing the copper tube junction bridges 99 joined longitudinally to form a water conduit 100 which on the isometric drawing is shown as vertical. Each horizontal row of thermocouples across the water conduit 100 are on their flat copper junction straps on both sides of the water conduit provided with cover plates and copper fins 101 in the direction of the air flow in accordance with FIGURES 5A and 5B. The unit is connected to a suitable power supply and provided with a thermostatic control system to control the supply of direct current with a polarity according to the need for cooling or heating. The water pipe system supplies the heat sink or the heat source. The liquid temperature can be separately conditioned by connection to a circulating system including a cooling and heating system for the liquid.

Figures 7, 8A, 8B, 8C:
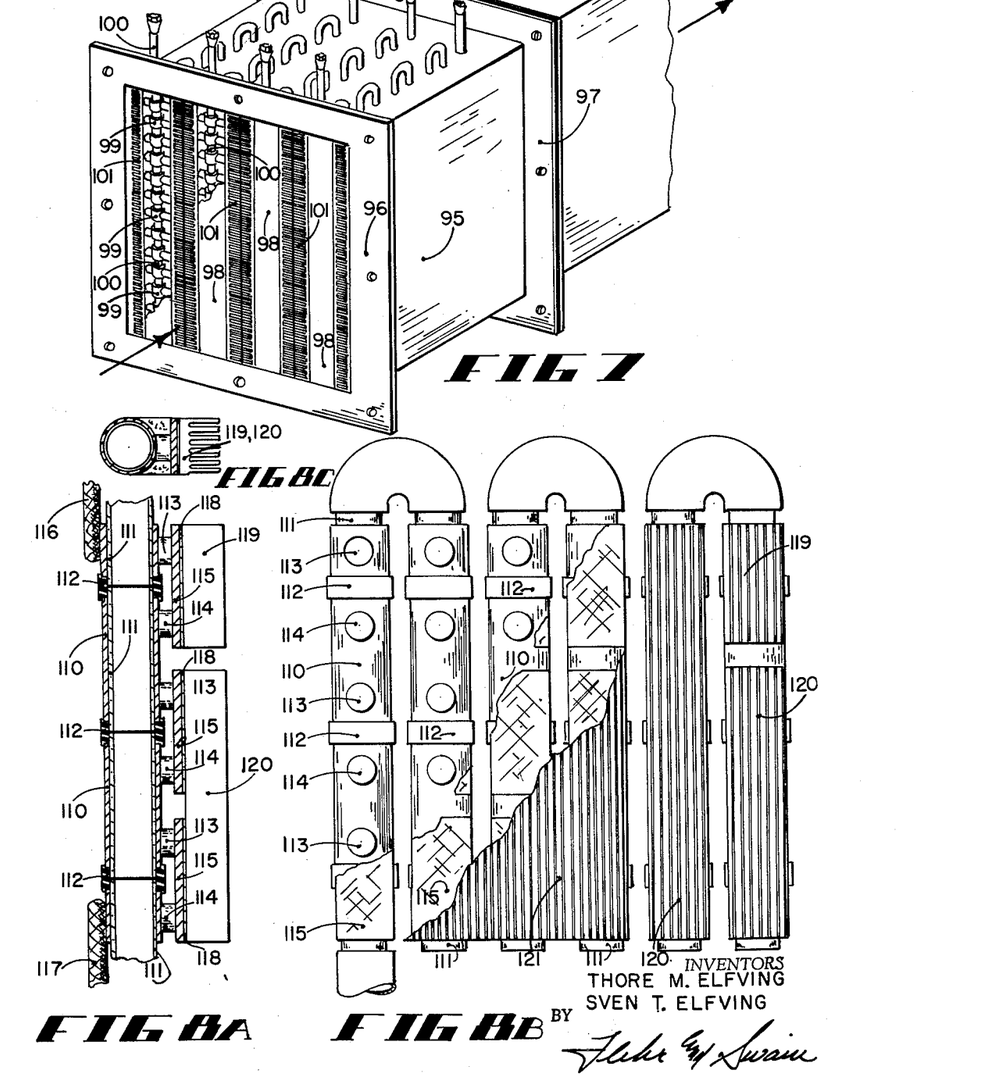
FIGURES 8A, 8B and 8C show a one-sided liquid to air thermoelectric heat pump unit corresponding to the liquid to liquid system shown in FIGURE 1.

In FIGURES 8A and 8B is shown another modification of the invention, namely, a water to air thermoelectric heat pump assembly corresponding to the water to water assembly shown in FIGURE 1. Copper tube sections 110 are, as before, joined longitudinally into a continuous water conduit by inserted ceramic sections 111 and nonconductive ring elements 112 glued to the ceramic ends and the copper sections 110. The thin ceramic tube sections 111 are, according to the invention, in thermal contact with the copper sections by soldering. Insulating film or lacquer material can be used instead of ceramic material. If the tube sections are made from aluminum, even anodizing or hard coating of the inside cylindrical surface can be sufficient as an electric insulation. As electrolysis of water does not start below 1.8–2 volts voltage difference, no electric insulation is needed inside the copper sections for the good functioning of the thermoelectric assembly. The electric insulation is, however, a sometimes requested safety measure. If no ceramic tube sections are inserted or only a lacquer film is used, the copper tube sections are, according to the invention, joined by nonconductive ring elements overlapping the ends of adjacent copper tube sections which, in this way, are electrically separated but mechanically firmly bonded to each other to form a continuous pipe.

In FIGURES 8A and 8B is shown how semiconducting P and N type blocks 113 and 114 are soldered between the tube sections and flat copper straps 115 to form a series of thermocouples supplied with direct current through the leads 116 and 117. The current can have such a polarity that the copper tube sections 110 are the hot junctions and the flat copper straps 115 the cold junctions of the thermoelectric array. Cooling water is then circulated through the tube sections 110 while the cold junctions are in heat exchange to the air by copper fins 119, FIGURES 8A and 8C, in thermal connection with the copper straps 115. According to the invention, there are several ways to arrange this heat exchange fin. If a ceramic spray or metallized soldered ceramic wafer 118 is on top of the flat copper straps 115 as described under FIGURE 5, a small finned copper plate 119 can be soldered to each individual cold junction strap. One modification is to make the fin sections in long strips 120 which are placed over a row of cold junctions as illustrated in the drawing. The fins can either run lengthwise along the strip or be placed crosswise, that is, be short in the direction of air flow. The latter alternative will lead to less heat equalizing and increased COP.

Still another modification is to have all cold junctions covered by a large finned plate 121 soldered to the metallized ceramic cold junction straps all over the assembly. Because of the ceramic insulation on the junction straps, the difference between these alternatives is only related to the thermal expansion and contraction problem. As previously described, the flexible joints provide a means where even a solid plate over all the junctions is an acceptable design. A radically different design is to leave out the electric insulation entirely and provide each individual cold junction strap with fins in direct metal contact with the junction. This alternative is suitably combined with the use of hot junction copper tube sections without electric insulation. A heat transfer is then taking place over the thermoelectric heat pump from air to water without passing through any electric insulation. This design is, from a safety point of view, allowable only under certain circumstances.

Figure 9A:
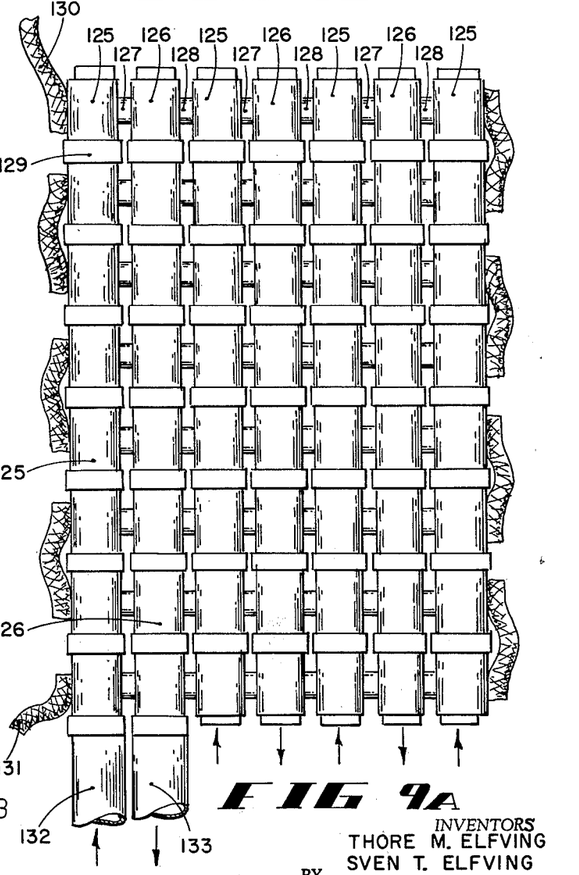
FIGURES 9A, 9B and 9C show still another liquid to liquid thermoelectric heat pump design according to the invention.
Figure 9B:
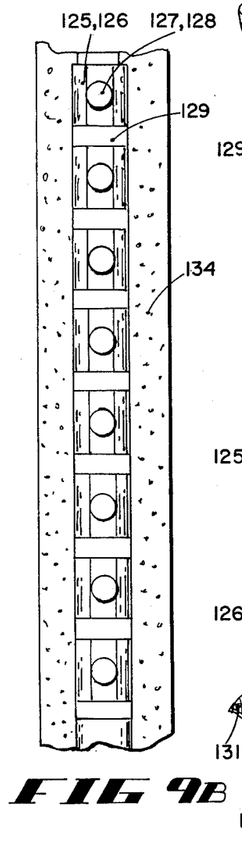
Figure 9C:
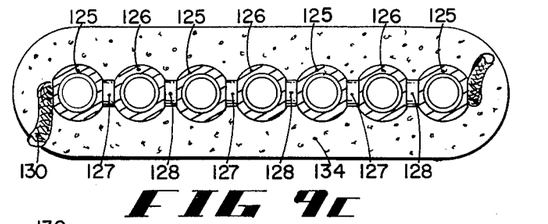

In FIGURES 9A, 9B and 9C is shown another thermoelectric liquid to liquid heat pump system suitable for assemblies in two-dimensional plane or curved sections, which can be placed together to form larger stacks. This system uses standardized thermocouples made from copper or aluminum tubes as junction bridges on both the hot and cold junction sides. The tube bridges are, as before, lined with soldered sections of thin ceramic tubes or electrically insulated from the liquid in any other suitable way. Different from the mounting in the three-dimensional array described under FIGURE 4, the hot and cold junction tube bridges 125 and 126, respectively, are placed alongside each other with semiconducting N and P type blocks 127 and 128, respectively, soldered between them. The tube sections are joined together by nonconductive ring elements 129 as previously described, and the thermocouples electrically connected in series and provided with leads 130 and 131 as illustrated by the figure. The liquid conduits formed by the longitudinally joined tube sections are, when supplied with a suitable direct current, forming alternate heat dissipating and heat absorbing pipe lines, connected to 132 and 133, respectively. These parallel pipelines can be mounted in a flat array or placed in a circle or any other form of bundle and provided with an insulation 134 as indicated in FIGURES 9B and 9C. The parallel pipes can be connected in many different ways for the passage of cooling water and liquids through them. The electric connections can be arranged for maximum coefficient of performance as previously described. A thermoelectric pipe system of this type is especially suitable for arranging a straight counterflow of the cooling water and the liquid to be cooled for maximum temperature drop in the liquid to be cooled, as indicated by arrows in the drawing.

The thermoelectric heat pump assembly shown in FIGURES 9A, 9B and 9C is also ideally suited for air cooled devices where hermetic heat transfer systems are used with heat absorbing panels in the refrigerated space and heat dissipating condensers exposed to the ambient air. As an example, the pipelines 132 on the hot junction side can be united by headers and connected upwards to the heat dissipating portion of a hermetic system, the pipelines 132 being the boiler portion of said system. The pipelines 133 on the cold junction side are in the same way united by headers and connected downwards with a heat absorbing panel in a hermetic system to cool a refrigerated space, the pipelines 133 serving as a condenser cooled by the thermoelectric heat pump. The hermetic systems can use double-walled panels of the rollbond type in connection with the hot and cold junction side conduits of the described thermoelectric heat pump which preferably should be mounted with the parallel pipelines in a vertical position.

Thermoelectric thermocouple assemblies of the described type lend themselves to simple and efficient cascades for heat pumping in two or more stages. The stages can be electrically "coupled" or independently fed by direct current. In the following example of a multi-stage arrangement of the latter type, FIGURE 9 is chosen as the basic water cooled first stage. The four cold junction pipelines 132 are in this case extended downwards in the form of a similar pipeline comprising joined tube sections which will form the hot junctions of the next stage. The pipes 132 are all closed at the top and at the extended lower ends joined by a header to form a hermetically closed heat transfer system filled with a refrigerant as a heat transferring medium. Between the lower portion of the four extended junction pipes are now placed three similar tube assemblies to form a thermocouple assembly similar with the assembly in FIGURE 9A with the difference that the extended pipes 132 represent the hot junctions and the three new pipes now are the locus of the cold junctions. The latter three added pipelines are in the same way extended downwards to form a second hermetic system and will now become the hot junction locus for the third stage. The cold junctions of the third stage are located along two pipes between the three mentioned hot junction pipes. These two pipes are again extended downwards and closed by a header to form a third hermetic system comprising the locus for the hot junctions belonging to the fourth and last stage of the cascade. The cold junctions of the last stage will be along a single pipe and would, in most cases, consist of only one junction which for many uses (infrared eyes, etc.) preferably would be enclosed in a vacuumized enclosure. With a water-cooled first stage, it will consequently take three hermetic heat transferring systems to form a four stage cascade of this type. One hermetic system is enough for a two stage cascade in which the two stages are separated in space with a minimum of heat losses between the warmest and coldest junctions. The described cascade system is simpler and more effective than similar multi-stage cascades based on conventional flat modules.

Larger two-stage thermoelectric heat pump systems for the cooling of brine in low temperature air conditioning or cold storage plants can use an intermediate liquid circulation system driven by a pump instead of a hermetic heat transfer system between the two stages. Thermoelectric stacks or piles according to the invention and described, FIGURES 4 and 9, are especially suited as heat pumps in both stages of such systems because of their unique pipe structure and their inherent properties as to accessibility, expansion, efficiency, etc.

The thermoelectric heat pump assemblies and heat exchangers, according to the present invention which have been described above, have all in common that at least one of the fluids between which heat transfer takes place is liquid. Therefore, either the hot junctions or the cold junctions or both are, according to the invention, in the form of cylinder sections or tubes made from a suitable metal such as copper. It has been described how these pipe sections are provided with a thin electric insulation of various types and joined longitudinally to form continuous conduits. It is possible to run cooling water through the tube systems according to the invention without an electric insulation inside the tubes. This alternative is, therefore, also part of the invention.

The pipe systems, according to the invention, can be used for circulating water or liquids as heat absorbing or heat dissipating media. The pipes comprising junction tube sections can also be incorporated in hermetic vapor/liquid phase heat transfer systems.

An important field of application for the thermoelectric cold junction pipelines, according to the invention, is ice freezing. Thermocouple arrays of the type described under FIGURES 2, 4 and 9 are especially suited for freezing of tube ice in pipes when water cooling is available. Release of the ice frozen in the cold junction pipes takes place by reversal of the current so that the junctions are thermoelectrically heated for a short while. Automatic ice freezing with periodic thawing periods by switching the polarity of the current can be arranged in any known way along the principles for tube-ice-freezers. Ice freezing in smaller quantities in air cooled devices can, according to the invention, take place in the pipe systems shown in FIGURES 5 and 8. The liquid lines are then open at one end with ice freezing taking place in several parallel pipes simultaneously. Air cooling by forced air is not necessary. The tight fin spacing shown in the drawing can be changed to larger fins suitable for natural convection. Thermoelectric ice freezers in assemblies or stacks according to the invention can be turned, pivoted or tilted when provided with flexible electric connections so that water filling and release of ice can take place in different positions of the pipes. This mechanism can be carried out by hand or controlled automatically according to the capacity of the ice freezer. The cold junction tubes forming the composite pipe in which freezing takes place can have an inside diameter larger than the tube length, the relation varying from 1:1 to 10:1.

The figures shown in the above description of the invention do not include all the combinations of thermocouple assemblies which are possible by means of the tube-shaped junctions joined into continuous pipes. Several other combinations will lead to hot and cold junctions united in separate lines either parallel or crossing each other in two or three-dimensional arrays. Such designs lead to assemblies or stacks which are insensitive to thermal expansion and contraction and with approximately the same qualities as the shown examples. The scope of the invention is, therefore, not limited in this respect.

In the figures is shown the use of cylindrical tubes as junction bridges. Other pipe or tube shapes can also be used, such as square or rectangular cross-sections, hexagonal extruded sections, etc. When the junction bridges are made from aluminum, several forms of extruded sections with or without cooling fins on the outside and/or inside of the "pipe" can be used.

An important feature of the present invention is the joining of tube junctions longitudinally into continuous pressure-tight conduits or pipelines by means of nonconductive joint material. The technique for joining metal parts to ceramics or porcelain is well developed and there is a great variety of ring-shaped joining elements with grooves in which the short junction tubes can be inserted and joined into a pressure or vacuum-tight structure. Suitable plastic joint materials can provide strong and, at the same time, flexible joints. A thermoelectric heat pump assembly according to the invention can, therefore, be made shock-proof and safe against breakage of junctions, etc., under the most severe conditions.

Thermoelectric heat pump assemblies according to the invention and described above can be enclosed in moisture-proof cans or boxes filled with powder or foam insulation. Such enclosures can be kept under vacuum in which case no insulation is needed.

The thermocouple arrays described above are also suitable for thermoelectric generators, that is, for generation of an electric current when liquids of different temperature are circulated through the pipelines formed by the junction bridges.

FIGURES 4 and 9 show suitable generator pile arrays for this purpose. The invention is, therefore, not limited in this respect.

We claim:

1. A thermoelectric assembly comprising a plurality of pairs of bodies of semiconductive material of opposite conductivity type each having hot and cold junction ends, a plurality of first metal tubes each joined to the cold junction ends of each of said pairs of bodies to form a junction bridge between them, a straight fluid conduit for circulation of a fluid therethrough, said first metal tubes being disposed along said conduit and electrically insulated from one another, and a plurality of second metal tubes joined to the hot junction ends of said bodies.

2. A thermoelectric assembly as in claim 1 including a second straight fluid conduit for the circulation of a fluid therethrough, said second metal tubes being spaced along said straight conduit and electrically insulated from one another.

3. A thermoelectric heat pump as in claim 2 wherein said conduits are formed by the metal tubes held in spaced relationship by insulating rings.

4. A thermoelectric heat pump as in claim 2 wherein said conduits are formed by a plurality of ceramic tubes each serving to mount a metal tube thereon.

5. A thermoelectric heat pump as in claim 1 wherein said fluid-tight conduit comprises a ceramic tube serving to mount the spaced metal tubes thereon.

6. A thermoelectric assembly as in claim 2 wherein said metal tubes are cylindrical and provided with flat surface areas to receive the junction end of the bodies of semiconductive material.

7. A thermoelectric assembly as in claim 2 wherein said second conduit is parallel to the first conduit.

8. A thermoelectric assembly as in claim 2 wherein there are provided a plurality of said first conduits and wherein said second conduit is disposed at an angle with respect to the same.

9. A thermoelectric assembly comprising a plurality of pairs of bodies of semiconductive material of opposite conductivity type each having hot and cold junction ends, a plurality of metal tubes each joined to similar junction ends of each of said pairs of bodies to form a junction bridge between them, said metal tubes forming junction bridges held in longitudinal alignment by electrical nonconductive means to form continuous fluid-tight conduits with the metal tubes spaced therealong and electrically insulated from one another; and a plurality of metal elements each joined to the other junction end of said bodies of semiconductive material.

10. A thermoelectric assembly as in claim 9 wherein said metal elements are provided with metal fins.

11. A thermoelectric assembly as in claim 9 wherein said metal elements are disposed generally perpendicular to the axis of said conduits.

12. A thermoelectric assembly as in claim 11 wherein said metal elements are provided with fins providing air circulation generally parallel to the axis of said conduits.

13. A thermoelectric assembly as in claim 9 wherein said metal elements comprise metal tubes.

14. A thermoelectric heat pump assembly comprising a plurality of bodies of P and N type semiconductor material, hot and cold junction bridges secured to said bodies and bridging between the ends of the same to form hot and cold junctions, said hot junction bridges in the form of first tube sections, said cold junction bridges in the form of second tube sections, said first and second tube sections having their axes perpendicular to the current direction in said bodies, groups of said respective first and second tube sections being longitudinally joined by electrically nonconductive ring elements to form fluid-tight continuous conduits.

15. A thermoelectric heat pump assembly as in claim 14 wherein said first and second tubes sections have their axes parallel to each other to form parallel continuous pipe assemblies of respectively hot and cold junctions in a two-dimensional array.

16. A thermoelectric heat pump assembly as in claim 14 wherein said first and second tube sections have their respective axes perpendicular to each other to form continuous pipe assemblies of respectively hot and cold junctions in a three-dimensional array.

17. A thermoelectric water to air heat pumping unit for cooling or heating of air circulated through said unit comprising a plurality of pairs of bodies of semiconductive material of opposite conductivity type each having hot and cold junction ends, a plurality of metal tubes each joined to similar junction ends of each of said pairs of bodies to form a junction bridge between them, a plurality of substantially parallel fluid-tight conduits for the circulation of a fluid therethrough, said metal tubes being disposed along said conduits and electrically insulated from one another, a plurality of metal elements each joined to the other junction end of said bodies of semiconductive material associated with different conduits, metal fins in heat transfer relationship with said metal elements, means for circulating water through said conduits, and means for circulating air past said metal fins in a direction perpendicular to the axis of said conduits.

18. A thermoelectric pumping unit as in claim 17 wherein said metal fins are directly attached to said metal bridge elements.

19. A thermoelectric pumping unit as in claim 17 wherein said metal fins are electrically insulated from said metal bridge elements.

20. A thermoelectric water to air heat pumping unit for cooling or heating of air circulated through said unit comprising a series of thermocouples with first and second hot or cold junction bridges, said first junction bridges being in heat exchange relationship with water and said second junction bridges being in heat exchange relationship with air; said first junction bridges being in the form of metal tube sections held in longitudinal alignment by electrically nonconductive means to form continuous water-tight conduits for circulation of water through said metal tube sections forming said first junction bridges; said second junction bridges being in the form of metal straps in thermal connection with extended surfaces for heat exchange to air; means for circulating water through said conduits; means for circulating air through said heat pumping unit; and means for supplying direct current power of selected polarity to said thermocouples.

21. A thermoelectric water to air heat pumping unit as in claim 20 wherein said metal straps forming said second junction bridges are each associated with two conduits.

22. A thermoelectric heat pump assembly as in claim 15 wherein said parallel continuous pipe assemblies of cold junctions are closed at one end to form compartments for ice freezing.

23. A thermoelectric assembly as in claim 9 wherein said fluid-tight conduits are closed at one end to form compartments for ice freezing.

24. A junction structure for thermoelectric heat pumps comprising at least a pair of semiconducting bodies of dissimilar material having hot and cold junction ends, a first metal tube joined on its side to similar junction ends of said bodies forming a junction bridge between them, second metal tubes each joined to one of the remaining junction ends of said bodies to form a thermocouple unit, and cooperating tubes each having poor electrical and good heat conductivity, each of said cooperating tubes having a length greater than said first and second metal tubes and serving to mount the metal tubes.

25. A thermoelectric heat pump assembly comprising a plurality of bodies of P and N type semiconductor material, hot and cold junction bridges secured to said bodies and bridging between the ends of the same to form hot and cold junctions, said hot junction bridges in the form of first tube sections, said cold junction bridges in the form of second tube sections, groups of said respective first and second tube sections being longitudinally joined by electrically non-conductive ring elements to form fluid-tight continuous conduits.

26. A thermoelectric heat pump assembly as in claim 25 wherein said first and second tube sections have their axes parallel to each other to form parallel continuous pipe assemblies of respectively hot and cold junctions in a two-dimensional array.

27. A thermoelectric heat pump assembly as in claim 25 wherein said first and second tube sections have their respective axes perpendicular to each other to form continuous pipe assemblies of respectively hot and cold junctions in a three-dimensional array.

References Cited by the Examiner
UNITED STATES PATENTS

| | | | |
|---|---|---|---|
| 2,734,344 | 2/56 | Lindenblad | 62—3 |
| 2,793,243 | 5/57 | Lindenblad | 62—3 |
| 2,870,610 | 1/59 | Lindenblad | 62—3 |
| 3,075,360 | 1/63 | Elfving | 62—3 |
| 3,077,080 | 2/63 | Pietsch | 62—3 |
| 3,083,543 | 4/63 | Stanton | 62—3 |
| 3,111,813 | 11/63 | Blumentritt | 62—3 |

WILLIAM J. WYE, *Primary Examiner.*